(12) United States Patent
Aguero-Hernandez et al.

(10) Patent No.: US 9,884,704 B2
(45) Date of Patent: Feb. 6, 2018

(54) CLIP-CLAMP WITH TOP LOCK DEVICE AND METHOD

(71) Applicants: Ernesto A. Aguero-Hernandez, Franklin Park, NJ (US); Adriana M. Amione-Aguero, Franklin Park, NJ (US)

(72) Inventors: Ernesto A. Aguero-Hernandez, Franklin Park, NJ (US); Adriana M. Amione-Aguero, Franklin Park, NJ (US)

( * ) Notice: Subject to any disclaimer, the term of this patent is extended or adjusted under 35 U.S.C. 154(b) by 37 days.

(21) Appl. No.: 14/818,108

(22) Filed: Aug. 4, 2015

(65) Prior Publication Data

US 2017/0036819 A1    Feb. 9, 2017

(51) Int. Cl.
  B65D 33/16    (2006.01)
  F16B 2/20    (2006.01)

(52) U.S. Cl.
  CPC .......... B65D 33/1675 (2013.01); F16B 2/205 (2013.01)

(58) Field of Classification Search
  CPC .................. B65D 33/1675; F16B 2/205; Y10T 24/44385; Y10T 24/44444; Y10T 24/44462; Y10T 24/44479
  See application file for complete search history.

(56) References Cited

U.S. PATENT DOCUMENTS

| | | | | |
|---|---|---|---|---|
| 1,306,073 A | * | 6/1919 | Mertens | A47G 25/485 24/511 |
| 3,461,876 A | * | 8/1969 | Miller, Jr. | A61B 17/122 24/543 |
| 3,571,861 A | * | 3/1971 | Olson | B65D 33/1675 24/30.5 P |
| 3,629,912 A | * | 12/1971 | Klopp | A47H 13/01 24/457 |
| 3,713,622 A | * | 1/1973 | Dinger | A61M 39/28 24/102 FC |
| 4,227,730 A | * | 10/1980 | Alexander | A61B 17/122 294/131 |
| 4,380,103 A | * | 4/1983 | McGrath | A44B 99/00 24/30.5 P |
| 4,835,824 A | * | 6/1989 | Durham | A61B 17/12 24/339 |
| 5,109,576 A | * | 5/1992 | Teekell | B65D 33/1675 24/30.5 P |
| 5,123,146 A | * | 6/1992 | Olson | B65D 33/1675 24/30.5 P |
| 5,179,768 A | * | 1/1993 | Jio | D06F 1/02 24/499 |
| 5,301,393 A | * | 4/1994 | Brown | B42F 1/02 24/499 |
| 5,414,911 A | * | 5/1995 | Adams | A44B 99/00 24/507 |

(Continued)

*Primary Examiner* — Robert Sandy
*Assistant Examiner* — Rowland Do
(74) *Attorney, Agent, or Firm* — Dave Alan Lingbeck

(57) ABSTRACT

A clip-clamp with top lock device for preferably closing and sealing bags and the like. The clip-clamp with top lock device includes a closure assembly including a pair of lever members spatially arranged and facing one another and also including an interconnector extending between the lever members, and further including at least one biased member connected to the lever members for memory retentiveness and to bias the lever members about and seal an opening of a container such as a bag.

4 Claims, 3 Drawing Sheets

(56) References Cited

U.S. PATENT DOCUMENTS

| | | | | |
|---|---|---|---|---|
| 5,640,742 A | * | 6/1997 | White | A44C 3/001 24/18 |
| 2008/0092349 A1 | * | 4/2008 | Cofer | A61M 5/1418 24/487 |

\* cited by examiner

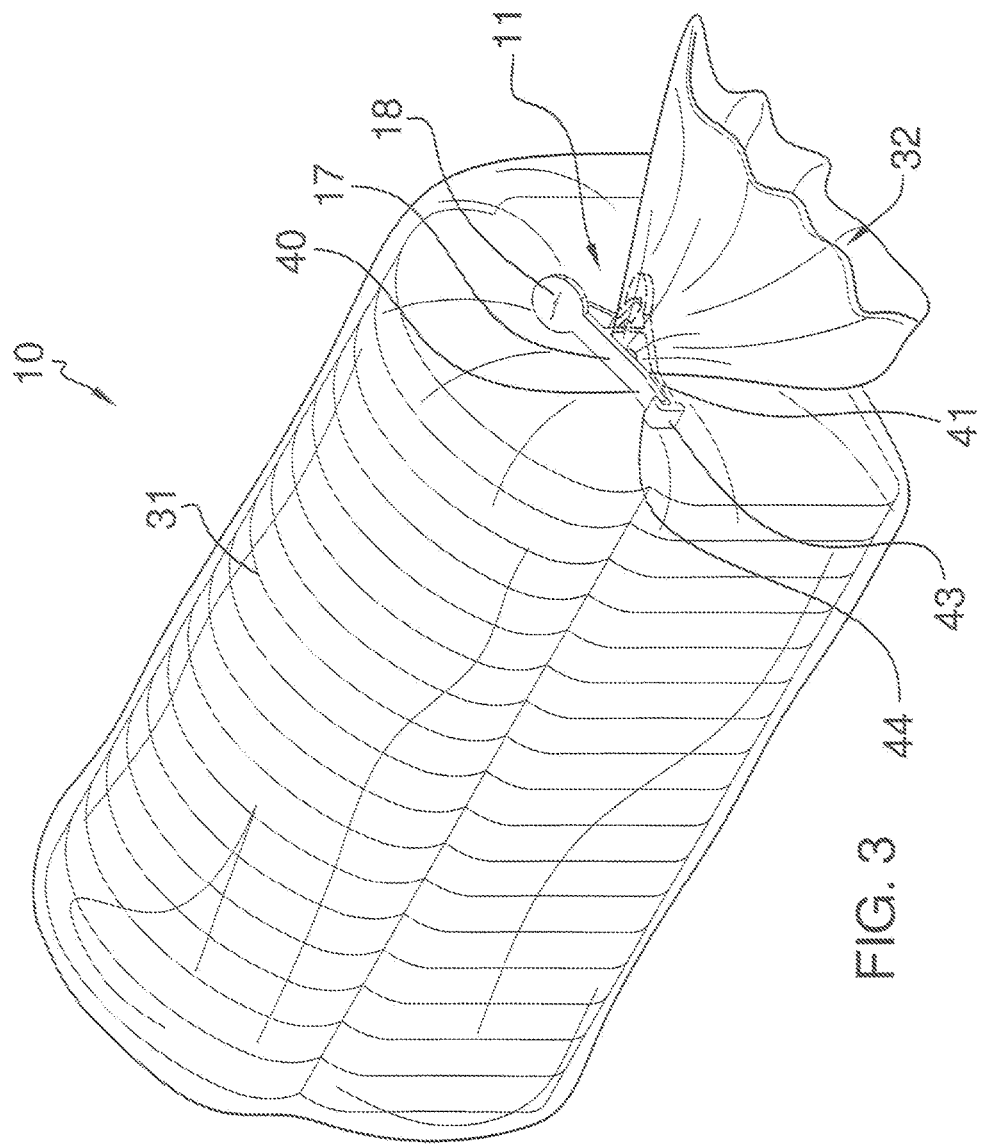

CLIP-CLAMP WITH TOP LOCK DEVICE AND METHOD

BACKGROUND OF THE INVENTION

Field of the Invention

The present invention relates to fasteners and more particularly pertains to a new clip-clamp with top lock device and method for preferably closing and sealing bags and the like.

Description of the Prior Art

The use of fasteners is known in the prior art. More specifically, fasteners heretofore devised and utilized are known to consist basically of familiar, expected and obvious structural, configurations, notwithstanding the myriad of designs encompassed by the crowded prior art which have been developed for the fulfillment of countless objectives and requirements.

The prior art includes a highly stable clothespin of the type having a pair of elongated clamping members and a helical metal spring interposed therebetween. Each of the pair of clamping members has a top clamping jaw, a tail, and an intermediate portion. The hollow body of the helical spring serves as a fulcrum about which the intermediate portions of the elongated clamping members are pivoted for opening and closing the jaws with respect to one another for gripping articles inserted therebetween. Another prior art includes an adjustable hose clip provided for use with a pool cleaner debris bag, including a first member having a retaining arm and a second member having a retaining arm. The hose clip also includes means for connecting the hose clip to a pool cleaner debris bag and resilient means for resiliency biasing the retaining arms towards each ether such that at least a portion of a pool hose can be retained between the retaining arms. While these devices fulfill their respective, particular objectives and requirements, the aforementioned patents do not disclose a new clip-clamp with top lock device and method.

SUMMARY OF THE INVENTION

The general purpose of the present invention, which will be described subsequently in greater detail, is to provide a new clip-clamp with top lock device and method which has many of the advantages of the fasteners mentioned heretofore and many novel features that result in a new clip-clamp with top lock device and method which is not anticipated, rendered obvious, suggested, or even implied by any of the prior art fasteners, either alone or in any combination thereof. The present invention includes a closure assembly including a pair of lever members spatially arranged and facing one another and also including an interconnector extending between the lever members, and further including at least one biased member connected to the lever members for memory retentiveness and to bias the lever members about and seal an opening of a container such as a bag. None of the prior art includes the combination of the elements of the present invention.

There has thus been outlined, rather broadly, the more important features of the clip-clamp with top lock device and method in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new clip-clamp with top lock device and method which has many of the advantages of the fasteners mentioned heretofore and many novel features that result in a new clip-clamp with top lock device and method which is not anticipated, rendered obvious, suggested, or even implied by any of the prior art fasteners, either alone or in any combination thereof.

Still another object of the present invention is to provide a new clip-clamp with top lock device and method for preferably closing and sealing bags and the like.

Still yet another object of the present invention is to provide a new clip-clamp with top lock device and method that conveniently gathers and guides the open end of a bag and the like within the clip-clamp with top lock device and method.

Even still another object of the present invention is to provide a new clip-clamp with top lock device and method that effectively clips and clamp shut the opening in the bag.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF INSCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the present invention closing and sealing a container.

DETAILED DESCRIPTION OF THE INVENTION

Figure 1:
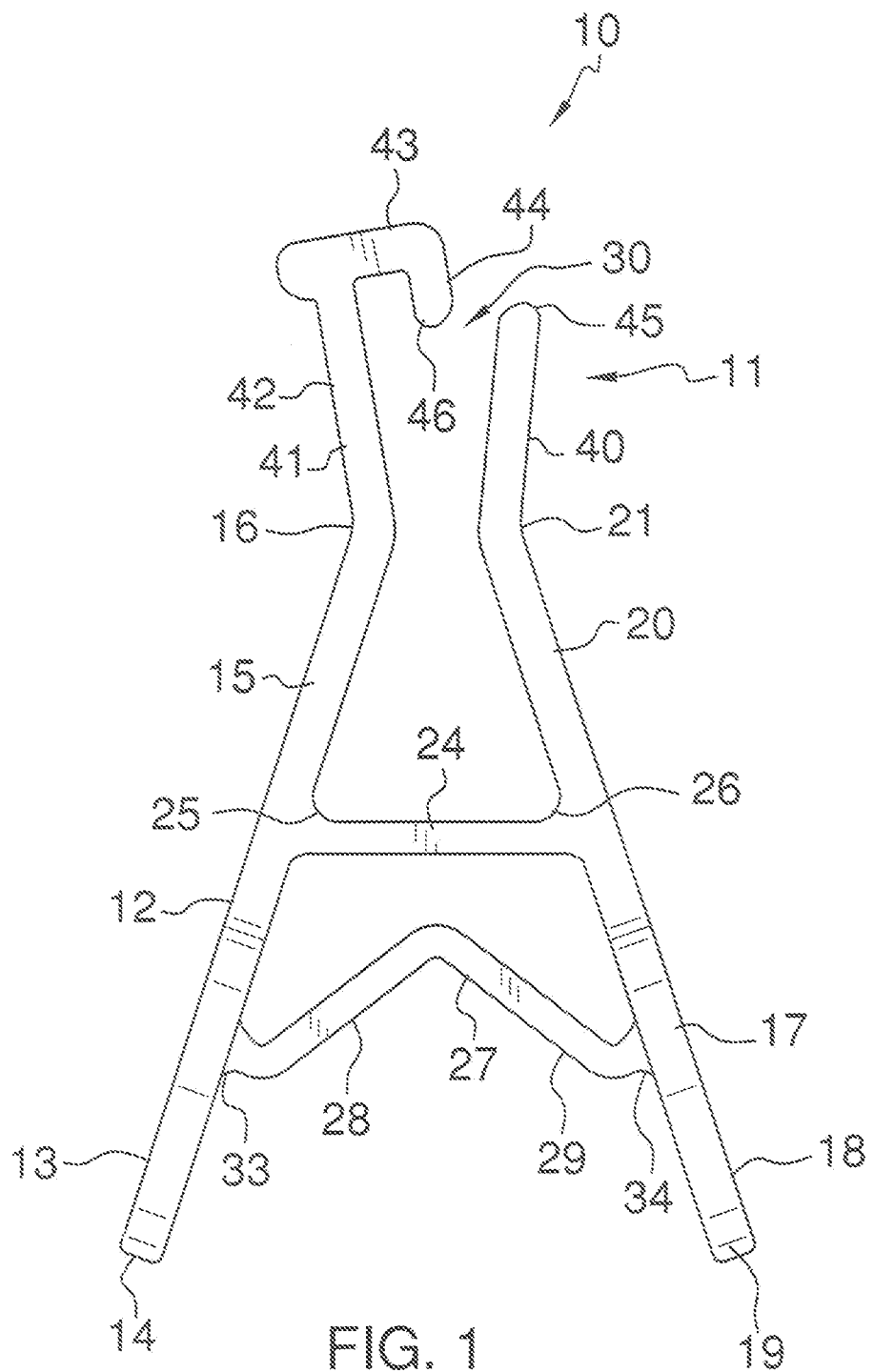
FIG. 1 is a side elevation view of a new clip-clamp with top lock device and method according to the present invention.
Figure 2:
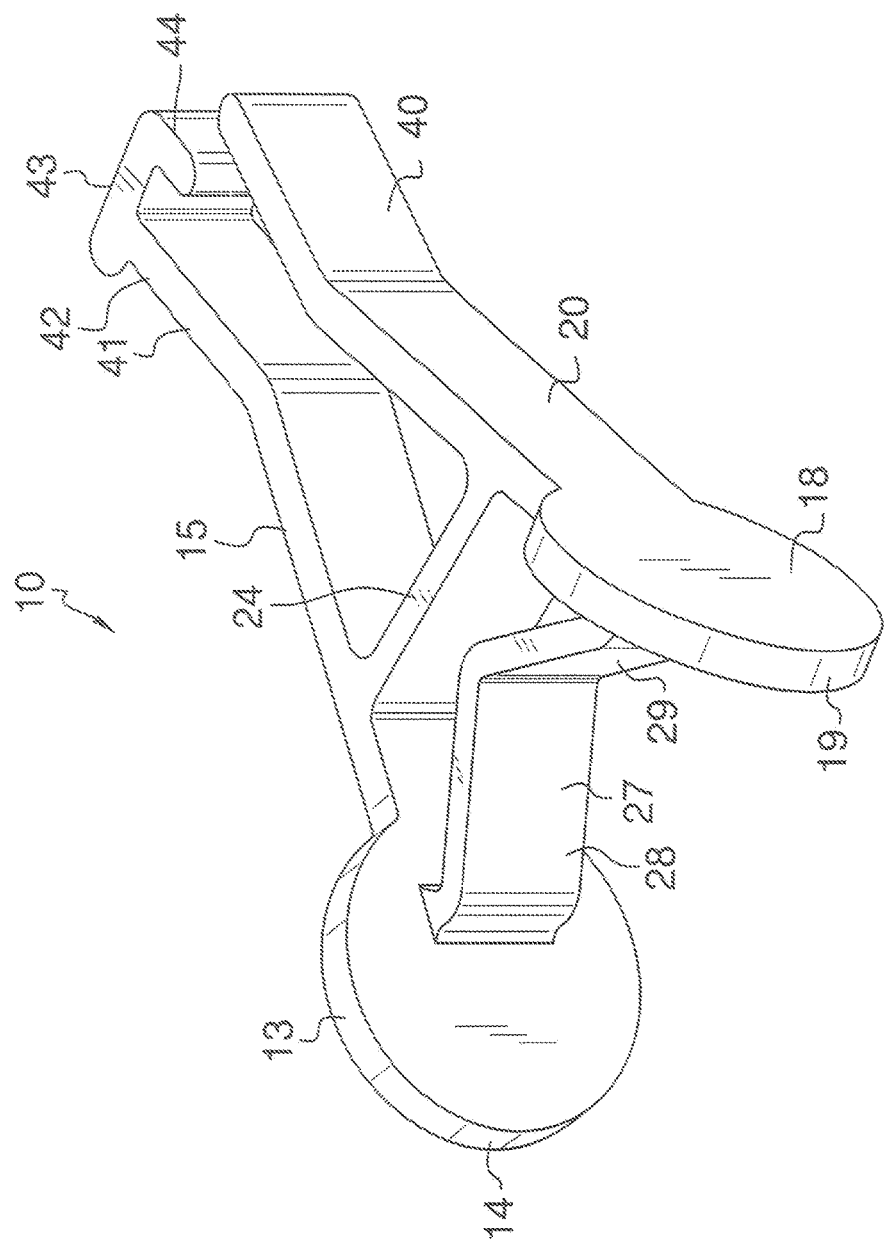
FIG. 2 is a bottom perspective view of the present invention.

With reference now to the drawings, and in particular to FIGS. 1 through 3 thereof, a new clip-clamp with top lock device and method embodying the principles and concepts of the present invention and generally designated by the reference numeral 10 will be described.

As best illustrated in FIGS. 1 through 3, the clip-clamp with top lock device 10 may generally comprise a closure assembly 11 including a pair of lever members 12, 17 made of any suitable material, but preferably plastic and spatially arranged and facing one another and also including an interconnector 24 also made of any suitable material but preferably plastic and having enhanced memory retention as a result of the plastic and extending between the lever members 12, 17, and further including at least one biased member 27 made of any suitable material but preferably plastic and having enhanced memory retention as a result of the plastic and integrally connected to the lever members 12, 17 to bias the lever members 12, 17 about and seal an opening 32 of a container 31 such as a bag containing bread and.

As shown in FIGS. 1 and 2, each of the lever members 12, 17 has a length and width and may include a handle portion 13, 18 having an enlarged rounded back end 14, 19 to facilitate manipulating the handle portion 13, 18, and may also include a front portion 15, 20 integrally connected to and extending top of the handle portion 13, 18 and having a front end 16, 21. The interconnector 24 may have ends 25, 26 each of which is integrally attached intermediate of a respective one of the lever members 12, 17 with the lever members 12, 17 capable of pivoting relative to the interconnector 24, the at least one biased member 27 and to one another. The at least one biased member 27 may be integrally attached to the back ends 14, 19 of the handle portions 13, 18 and may extend therebetween to pivot the lever members 12, 17 and bias the front ends 16, 21 of the lever members 12, 17 substantially together to enclose and seal about the opening 32 of the container 31. The at least one biased member 27 may include a pair of extended portions 28, 29 each having an end 33, 34 which is integrally and pivotally attached to a respective one of the back ends 14, 19 of the handle portions 13, 18 with the extended portions 28, 29 angled relative to one another and having a length substantially less than that of the lever members 12, 17. The extended portions 28, 29 may extend inwardly of the closure assembly 11 and may extend from the back ends 14, 19 of the handle portions 13, 18 to a location proximate to the interconnector 24 where the extended portions 28, 29 integrally connect. The at least one biased member 27 may be an inverted V-shaped wedge to urge the handle portions 13, 18 away from one another and the front ends 16, 21 together for memory retention. As another embodiment, the at least one biased member 27 may be a semi-circular shaped wedge disposed between the handle portions 13, 18 of the lever members 12, 17.

As illustrated in FIGS. 1-3, the closure assembly 11 may also include first and second closure members 40,41 made of any suitable material but preferably plastic and integrally attached to and extending linearly and outwardly from the front ends 16, 21 of the lever members 12, 17 with the first closure member 40 having an outer end 45 and a length substantially less than that of the lever members 12, 17. The second closure member 41 may have a proximate portion 42 which may be angled away from the first closure member 40 when the lever members 13, 18 are in a biased position and the proximate portion 42 of the second closure member 41 may be disposed substantially parallel to the first closure member 40 when the first and second closure members 40,41 are engaged with one another. The proximate portion 42 of the second closure member 41 and the first closure member 40 each may be angled relative to the lever member 12, 17 to which the respective first and second closure members 40,41 is attached. The second closure member 41 may also have an intermediate portion 43 integrally attached to and extending perpendicular to the proximate portion 42 with the intermediate portion 43 extending in a direction of the first closure member 40. In addition, the second closure member 41 may have a distal end portion 44 having an end 46 and integrally attached to and extending perpendicular to the intermediate portion 43 with the distal end portion 44 spaced from the proximate portion 42 of the second closure member 41 with the end 46 of the distal end portion 44 engagable and lockable with outer end 45 of the first closure member 40 to tightly seal the container 31 therebetween.

In use as illustrated in FIG. 3, the first and second closure members 40,41 may be urged apart to form an opening 30 therebetween. The user may grasp and squeeze the handle portions 13, 18 towards one another to urge the first and second closure members 40,41 apart to form the opening 30 therebetween. At least a portion of the container 31 may be inserted between the first and second closure members 40,41 through the opening 30. The portion of the container 31 proximate to the opening 32 of the container 31 is gathered between the first and second closure members 40,41. The portion of the container 31 proximate to the opening 32 in the container 31 may be inserted through the opening 30 between the first and second closure members 40,41. The user may urge the first and second closure members 40,41 together by squeezing together the proximate portion 42 of the second closure member 41 and the first closure member 40 with the first closure member 40 disposed between the distal end portion 44 and the proximate portion 42 of the second closure member 41 and engaged with and forming a lock with the distal end portion 44 of the second closure member 42 to seal the opening 32 in the container 31. To unseal the opening 32 in the container 31, the user may squeeze the handle portions 13,18 together to unclip and disengage the first closure member 40 from the distal end portion 44 of the second closure member 41 to form the opening 30 between the first and second closure members 40,41 to allow the removal of the container 31 through the opening 30 between the first and second closure members 40,41.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the clip-clamp with top lock device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A clip-clamp with top lock device as comprising:
   a closure assembly including a pair of lever members spatially arranged and facing one another and also including an interconnector extending between the lever members, and further including at least one biased member connected to the lever members to bias the lever members about and seal an opening of a container such as a bag as a result of memory retention, wherein each of the lever members includes a handle portion having a back end, and also includes a front portion having a front end, wherein the closure assembly also includes first and second closure members engagable to one another and attached to and extending from the front ends of the lever members to seal a portion of the container therebetween, wherein the first closure member has an outer end, wherein each of the first and second closure members is angled relative to the lever member to which the respective first and second closure members is attached, wherein the second closure member includes a proximate portion angled away from the first closure member when the lever members are in a biased position and the proximate portion of the second closure member is disposed parallel to the first closure member when the first and second closure members are engaged with one another.

2. The clip-clamp with top lock device as described in claim 1, wherein the second closure member also has an intermediate portion integrally attached to and extending perpendicular to the proximate portion with the intermediate portion extending in a direction of the first closure member.

3. The clip-clamp with top lock device as described in claim 2, wherein the second closure member also has a distal end portion having an end and integrally attached to and extending perpendicular to the intermediate portion with the distal end portion spaced from the proximate portion of the second closure member and engagable and lockable with the first closure member to tightly seal the container therebetween.

4. The clip-clamp with top lock device as described in claim 3, wherein the first closure member is disposed between the distal end portion and the proximate portion of the second closure member when the outer end of the first closure member is engaged with and clipped to the end of the distal end portion of the second closure member.

\* \* \* \* \*